R. A. DITTRICK.
LEVEL.
APPLICATION FILED JAN. 25, 1917.
1,296,372.
Patented Mar. 4, 1919.
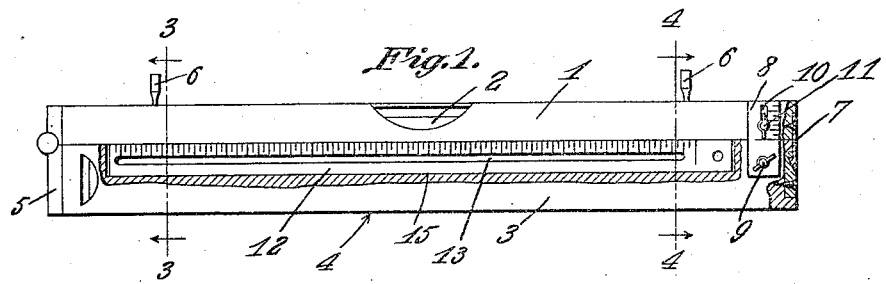
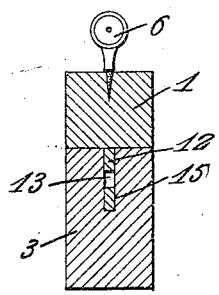
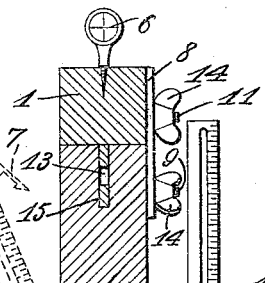
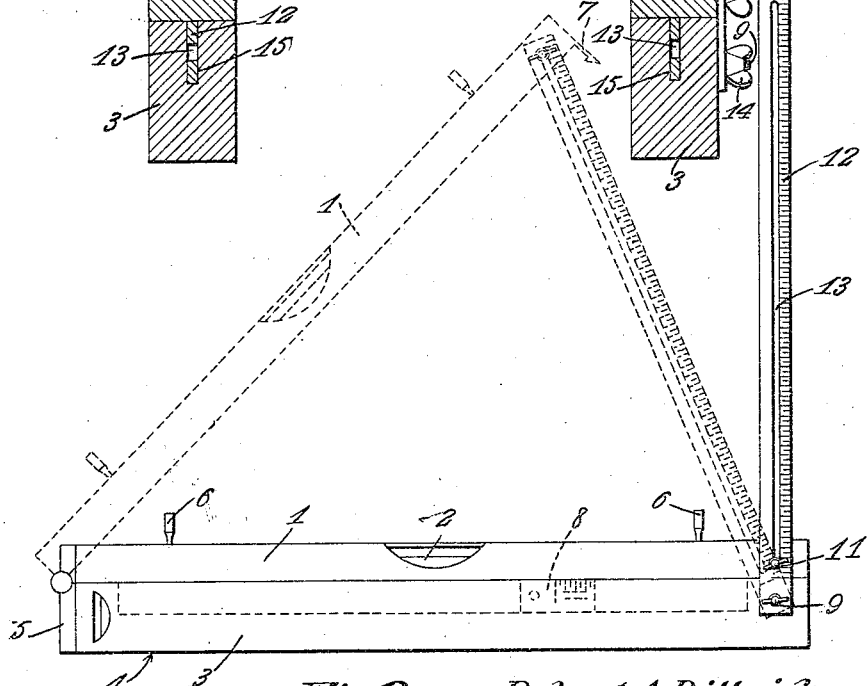
Robert A. Dittrick, INVENTOR

UNITED STATES PATENT OFFICE.

ROBERT A. DITTRICK, OF FORT MYERS, FLORIDA.

LEVEL.

1,296,372.　　　　　Specification of Letters Patent.　　Patented Mar. 4, 1919.

Application filed January 25, 1917. Serial No. 144,502.

*To all whom it may concern:*

Be it known that I, ROBERT A. DITTRICK, a citizen of the United States, residing at Fort Myers, in the county of Lee and State of Florida, have invented certain new and useful Improvements in Levels, of which the following is a specification.

This invention relates to levels and more particularly to a graduated level designed to determine the angle at which the level is disposed while in use.

One of the objects of the invention is to provide a scale pivotally mounted upon one end of a spirit level bar in a manner that will permit the scale to coöperate with the level bar for determining the angle of the article upon which the level is being used.

A further object of the invention resides in the provision of a graduated scale adapted to be compactly disposed of in a minimum space when the same is not in use so that the device may retain the appearance of the ordinary spirit level when the scale is not employed.

Another object of the invention is to provide two accessory level bars one of which carries the ordinary spirit level which may be disposed in a horizontal plane while the other level bar is engaged with the article to be measured.

A further object of this invention is the provision of a level which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation partly broken away to disclose the scale pocket.

Fig. 2 is a side elevation showing the scale in use.

Fig. 3 is a section on the line 3—3 of Fig. 1, and

Fig. 4 is a section on the line 4—4 of Fig. 1.

Referring to the drawing, wherein is illustrated the preferred form of my invention, and in which like numerals of reference indicate corresponding parts throughout the several views, the level bar 1 is provided with the usual spirit level 2 and this level bar is normally seated upon an accessory level bar 3 which has one edge 4 planed perfectly straight to provide a straight edge for engaging the material or article which is to be measured. The ends of the bars 1 and 3 are hingedly connected together by the hinge 5 so that the level bar 1 may be swung to any desired angle as shown by dotted lines in Fig. 2. Sights 6 are mounted upon the ends of the level bar 1 for the purpose of alining the level bar with any distant point in the usual manner.

The opposite ends of the bars 1 and 3 are normally held in engagement with each other by the spring latch 7 formed from a spring clip having one end rigidly secured to the end of the bar 1. The opposite end of the clip carries a lug adapted to engage with a notch in the end of the bar 3.

A short scale 8 is mounted upon the side faces of the bars 1 and 2 at one end thereof and one end of the scale has an aperture for receiving a fastening screw 9. In the opposite end of the scale 8 is a slot 10 through which a fastening screw 11 is projected the head of which is disposed in the slot 10 so that the scale is free to pivot on the fastening screw 9. A long graduated scale 12 has one end provided with an aperture for receiving the fastening screw 9 when a long scale is mounted in operative position. The longitudinal slot 13 in the scale 12 permits the fastening screw 11 to extend through the scale 12 so that the two scales 8 and 12 may be fastened together by the wing nuts 14 mounted upon the fastening screws. Since it is obvious that the screw 11 is carried by the end of the bar 1, it will be noted that the screw 11 will pass through the slot 13 when the level bar 1 is swung to the position shown by dotted lines in Fig. 2. It will be understood of course that the level bar might be stopped at any desired angle whereupon the wing nut can be tightened for securing the scale and the level bar 1 together.

A longitudinal depression or pocket 15 is provided in the lower bar 3 for receiving the scale 12 when the same is not in use.

Assuming that the angle of a water pipe is desired to be determined, the straight edge 4 will be placed upon the pipe and the level bar 1 swung to a position that will cause the spirit level to indicate a horizontal plane. The level bar 1 will then be perfectly horizontal and the swing nut can be tightened for holding the level bar to the scale. The graduations on the scale will indicate the angle at which the straight edge is disposed with respect to the level bar.

From the foregoing it will be observed that a very simple and durable level has been provided, the details of which embody the preferred form. I desire it to be understood, however, that slight changes in the minor details of construction may be made without departing from the spirit of the invention or the scope of the claim hereunto appended.

I claim:

The combination of a level bar and an accessory level bar, the ends of the bars being hingedly connected together whereby the said level bar may normally rest upon the said accessory bar, the free end of each bar being provided at one side thereof with a fastening screw carrying a removable thumb nut, a relatively long longitudinally slotted scale having one end mounted on the fastening screw in the said accessory bar, the other screw being extended through the said slot near the lower end thereof whereby the said scale is normally held at right angles to the said bars when the latter are in engagement with each other, the said fastening screw on the accessory bar acting as a pivot for the said scale when the other fastening screw is moved longitudinally of the slot when the said level bar is swung on the hinge.

In testimony whereof I affix my signature in presence of two witnesses.

ROBERT A. DITTRICK.

Witnesses:
LOUIS E. PARENT,
E. BARNETT.